(12) United States Patent
Artuso

(10) Patent No.: US 11,012,968 B2
(45) Date of Patent: May 18, 2021

(54) SMALL-CELL MOVEMENT DETECTION

(71) Applicant: T-Mobile USA, Inc., Bellevue, WA (US)

(72) Inventor: Daniel Artuso, Concord, CA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 16/861,436

(22) Filed: Apr. 29, 2020

(65) Prior Publication Data

US 2020/0337016 A1   Oct. 22, 2020

Related U.S. Application Data

(63) Continuation of application No. 16/388,980, filed on Apr. 19, 2019, now Pat. No. 10,694,490.

(51) Int. Cl.
| | |
|---|---|
| *H04W 24/00* | (2009.01) |
| *H04W 64/00* | (2009.01) |
| *G01P 1/02* | (2006.01) |
| *G01S 19/13* | (2010.01) |
| *H04L 29/08* | (2006.01) |
| *H01Q 1/02* | (2006.01) |

(52) U.S. Cl.
CPC ........... *H04W 64/003* (2013.01); *G01P 1/023* (2013.01); *G01S 19/13* (2013.01); *H01Q 1/02* (2013.01); *H04L 67/12* (2013.01)

(58) Field of Classification Search
CPC ...... H04W 64/003; G01S 19/13; G01P 1/023; H01Q 1/02; H04L 67/12
USPC ......................................................... 455/424
See application file for complete search history.

(56) References Cited

U.S. PATENT DOCUMENTS

| | | | |
|---|---|---|---|
| 9,414,188 B2 * | 8/2016 | Gao | G01S 5/0045 |
| 10,694,490 B1 * | 6/2020 | Artuso | G01P 1/023 |

* cited by examiner

*Primary Examiner* — Amancio Gonzalez
(74) *Attorney, Agent, or Firm* — Loeb & Loeb LLP

(57) ABSTRACT

In cell-based wireless network systems supporting subscriber device communication, any movement of a cell's antenna may interrupt service. As cell sizes decrease and transmission frequencies increase, especially with 5G systems, cell transceivers that were once tower or building based are being mounted on smaller structures including the strand of a wired network infrastructure. However, smaller structures may be subject to movement due to weather, nearby traffic, surf, or other conditions. A cell apparatus, particularly one mounted on a structure subject to movement may include a motion detector to report motion of the cell apparatus. A wired or wireless network channel apart from the wireless network system may be used to transport movement data to a network service center or performance analysis server.

20 Claims, 4 Drawing Sheets

SMALL-CELL MOVEMENT DETECTION

CROSS-REFERENCE TO RELATED APPLICATIONS

This application is a continuation of and claims priority to U.S. patent application Ser. No. 16/388,980, filed Apr. 19, 2019, entitled "SMALL-CELL MOVEMENT DETECTION," the entire contents of which are incorporated herein by reference.

BACKGROUND

The background description provided herein is for the purpose of generally presenting the context of the disclosure. The work of the presently named inventors, to the extent it is described in this background section, as well as aspects of the description that may not otherwise qualify as prior art at the time of filing, are neither expressly nor impliedly admitted as prior art against the present disclosure.

Communications using small-cell transceivers in wireless network systems can be affected by movement of the transceiver. In some systems, movement of even a few centimeters can cause enough of a signal impedance change to affect communication channels, for example, causing dropped calls or reducing data rates.

SUMMARY

In an embodiment, a motion sensing device may be incorporated into a small cell apparatus to report movement of the cell to a central station for analysis. This may be particularly true when the cell is mounted on structures subject to movement including a mid-span installation on an outdoor cable, such as on the strand used to support wired network cabling. Such an installation may be subject to movement due to wind, other weather conditions, or nearby activity. The motion sensing device may include one or more accelerometers, a GPS receiver, optical sensors or combinations of these or others. Movement may be reported to a server for analysis and processing, including matching cell motion to call statistics. When a determination is made that movement of the small cell apparatus is causing service issues, the cell location may be stabilized or the apparatus may be remounted or moved.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Cellular telephone sites are traditionally mounted on towers or buildings that provide stable platforms for the antenna structures associated with the cell site. The relatively low frequencies of the cell sites, such as 700 MHz, accommodate both coverage areas in the kilometers and an inherent insensitivity to antenna movement. In more recent cellular system designs using a small cell apparatus, the combination of lower power cell transmitters along with higher frequencies into the tens of GHz and their correspondingly shorter wavelengths may result in a greater sensitivity to cell/antenna motion. This may be particularly true in the case of beam-forming technology used to steer radio energy to a particular target device.

In the following discussion, although the actual interest is in the movement of an antenna, the construction of a small cell apparatus generally involves an integral antenna, so that movement of the small cell directly corresponds to movement of its antenna. In a case where the actual transceiver may be remote from its antenna, the following teachings may be applied to the antenna itself. However, for the sake of simplicity, the former example will be used in this description.

In order to measure antenna motion, a small cell apparatus may include a motion sensing device to measure and report movement of the small cell apparatus. This movement information may be used in analyzing the effects of cell movement on call quality of service. For example, measured cell movement may be correlated to quality measurements such as dropped calls, lost packets, packet retries, or data rate.

Figure 1:
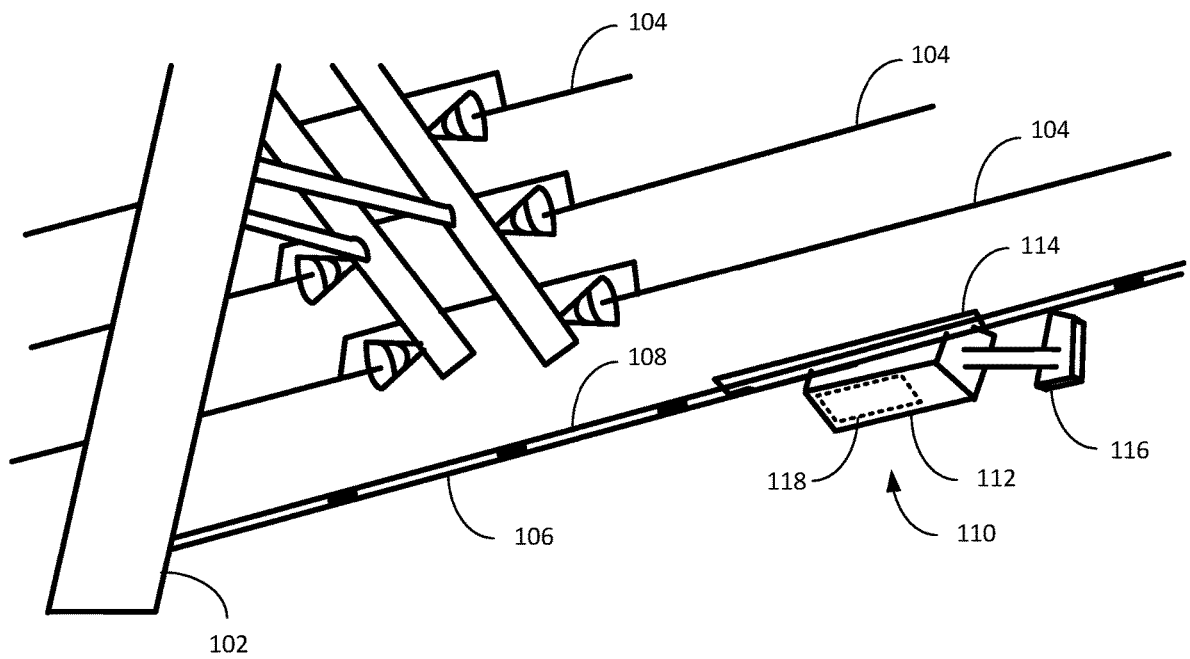
FIG. 1 is an illustration of an exemplary strand mounted small cell apparatus in accordance with the current disclosure.

FIG. 1 is an illustration of a simplified and exemplary embodiment of a small cell apparatus 110 showing a strand-mounting. A pole 102 may support multiple wired lines, including power transmission lines 104 and a small signal line 106. Typically, a small signal line 106 may be mounted 40 inches or more below the power transmission lines 104. The small signal line 106 may include wired (landline) telephone conductors, cable TV/Internet conductors, fiber optic lines, or other signal carriers that do not represent an electrocution risk. The small signal line 106 may be hung from a steel cable or similar support mechanism known as a strand 108. In some cases, the strand 108 may be encased within a jacket (not depicted) holding the associated small signal line 106 while in other cases, the strand may be visibly separate from the small signal line 106.

The small cell apparatus 110 may include a housing 112 with a mounting structure 114 that couples the apparatus 110 to, in this example, the strand 108. The housing 112 may be weather resistant to provide protection from the elements, especially rain, snow, or ice. The housing 112 may also provide interior mounting surfaces for the various components making up the small cell apparatus 110. The apparatus 110 may also include an antenna 116, although in some embodiments the antenna 116 may be internal to the housing 112. Various electronics 118 may be mounted inside the housing 112 as illustrated in FIG. 2.

Figure 2:
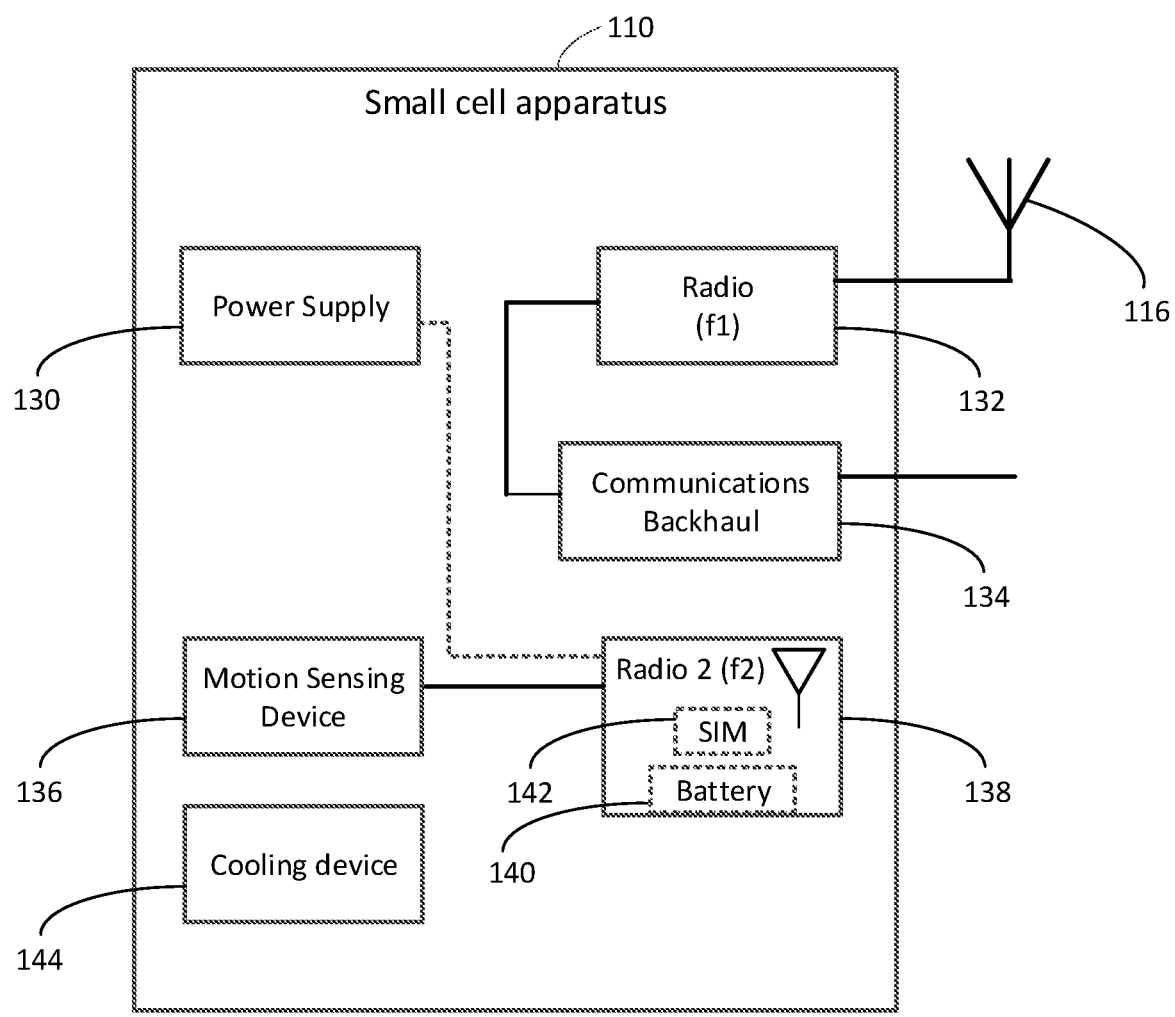
FIG. 2 is a block diagram of the internal components of an exemplary small cell apparatus in accordance with the current disclosure.

The small cell apparatus 110 may include various mechanical, electrical, and electronic components as illustrated in FIG. 2. A power supply 130 may supply power to the other components of the apparatus 110 and may include a battery or high value capacitor to maintain power at the apparatus 110 should external power be interrupted.

A first radio 132 may support communication with subscriber units for voice and data communications in accordance with known standards such as 4G LTE, 5G, WiFi, etc. The first radio may operate on first frequency in accordance with the appropriate standard and local configuration. A backhaul communications device 134 may transport subscriber unit communication to and from a hub, switch, or router associated with completing a communication path to a destination service or device.

A motion sensing device 136 may be configured to use one or more techniques to detect movement of the apparatus 110. The motion sensing device 136 is discussed in more detail below with respect to FIG. 3.

A second radio 138 may be used to transmit motion data from the motion sensing device 136 to a server or analysis center (not depicted). In some embodiments, the second radio 138 may be integral to the motion sensing device 136. In some embodiments, the second radio 138 may contain its own battery 140 for powering the unit, such as a long-life lithium ion battery that may power the second radio (and optionally, the corresponding sensors in the motion sensing device 136) for up to several years. In other cases, the second radio 138, the entire motion sensing device 136, or both, may be powered via the apparatus power supply 130. The second radio 138 may also include a subscriber identify module (SIM) 142 for use in identification of the motion sensing device 136 as well as for security purposes including key storage, authentication, and data encryption.

The second radio may use a specialized protocol to optimize for efficiency, especially since the motion sensing device 136 may not require high data rates but in this application conservation of battery life may be important. Some protocols that may be useful in this application are lightweight machine-to-machine (LwM2M), narrowband Internet-of-Things (NB-IoT), long range (LoRa), or differential binary phase shift keying (DBPSK) from SigFox, etc. In some embodiments, the motion data may be communicated via the backhaul communications device 134.

A cooling device 144 may be used to cool the small cell apparatus 110, or in some cases, may be part of the motion sensing device 136 for providing cooling to the device 136. In some locations, particularly a strand mount in a desert climate, the apparatus 110 may be exposed to direct sun over a long period of time, requiring some form of cooling. The cooling device 144 may be passive, such as cooling fins, may be active, such as a fan, or may be a combination of both. In other embodiments, another form of cooling may be used, such as a circulating liquid.

Figure 3:
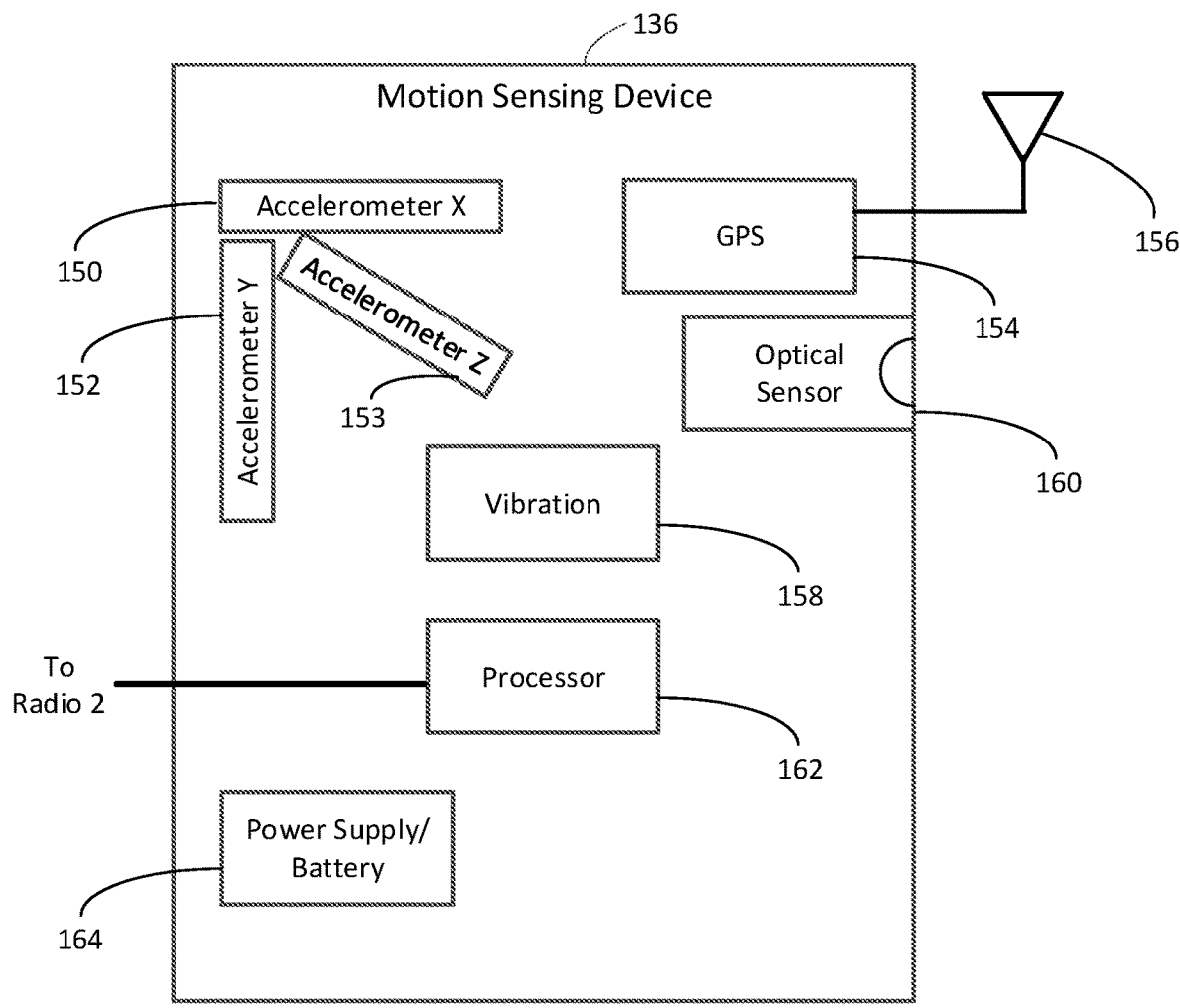
FIG. 3 is a block diagram of an exemplary motion sensing device for use in the small cell apparatus of FIG. 2.

Turning to FIG. 3, a block diagram of an exemplary motion sensing device 136 is discussed and described. The motion sensing device 136 may include one or more accelerometers 150, 152 153. The accelerometers 150, 152, 153 may be mounted orthogonally to provide measurements in different axes. For example, in a strand-mounted apparatus, movement parallel to the strand 108 may be limited by the mounting structure 114 while movement perpendicular to the strand may occur due to any of the environmental conditions described above. For that reason, the one or more accelerometers 150, 152 may be mounted to detect motion normal to the strand. In some embodiments, the motion sensing device 136 may include the third axis sensor 153, depending on the mounting arrangement and the influences for motion. Some prepackaged accelerometers include multi-axis sensors and may be suitable for this application. The accelerometers 150, 152, 153 may be mounted to the housing 112 or to an antenna 116 or an antenna support. A Global Navigation Satellite System (GNSS) 154, such as GPS or Glonass, may also be part of the motion sensing device 136. Signals received via the GNSS antenna 156 may be used to observe movement of the motion sensing device 136. A vibration sensor 158 may be included in the motion sensing device 136. While the vibration sensor 158 may simply be another form of accelerometer, the vibration sensor 158 may be sensitive at a higher frequency so that, for example, harmonic motion at a higher frequency that that caused by simple wind sway may be detectable.

In an embodiment, an optical sensor 160 may be used to detect motion instead of or in conjunction with one or more of the other sensors described. The optical sensor may operate in the visible light band or may operate in a non-visible spectrum such as infrared. Optical processing maybe used to detect motion by comparing the image features of known fixed objects, such as a nearby building, to current images to detect a shift indicating movement. In an embodiment, the optical sensor 160 may be directed to an object offline from any expected motion so that the shift in image may be more prominent. It is anticipated that in various embodiments, as few as one sensor up to all the sensors described or others may incorporated into the motion sensing apparatus 136.

A processor 162, such as a single chip computer or other controller may collect data from the various sensors 150, 152, 153, 154, 158, 160 that are present in any given embodiment and transmit that data, via the second radio 138 for analysis. In operation, the motion sensing device 136 may be configured collect data at a given rate, such as every 500 milliseconds, and report the collected data periodically, such as once an hour. In another embodiment, the motion sensing device 136 may only report motion data when a certain motion threshold is reached. In some embodiments, such a threshold may include a minimum amount of movement, a minimum duration of movement, or both. In other embodiments, the motion sensing device 136 may be polled, for example, so that the external analysis service requests data only when errors associated with the cell apparatus 110 are observed. The unit may be independently powered by a battery 164. In other embodiments, the motion sensing device 136 may use external power.

Figure 4:
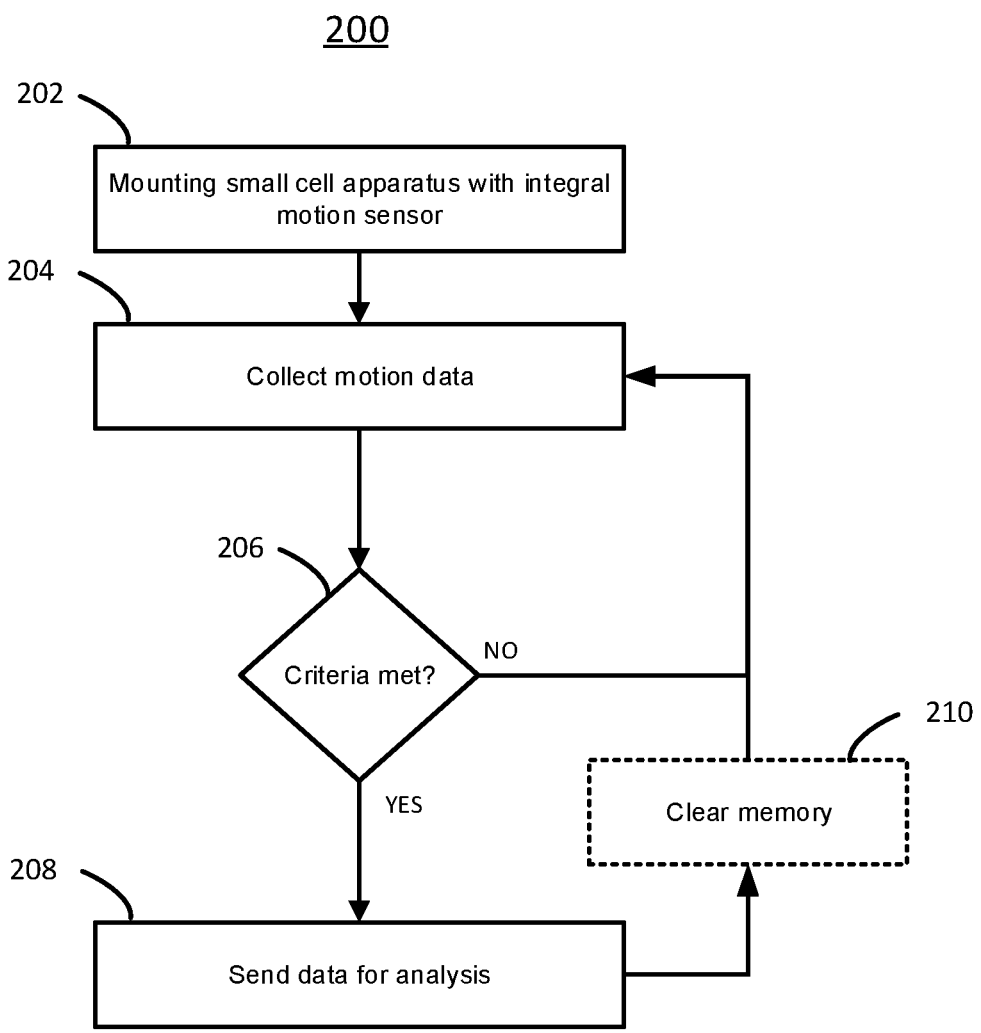
FIG. 4 is a flowchart of a method of detecting and sending motion data in the small cell apparatus of FIG. 2.

FIG. 4 is a flowchart of a method 200 of detecting motion in a small cell apparatus 110. At block 202, the small cell apparatus 110 may be coupled to a support using a mounting structure 114. In some embodiments, the support may be a strand 108 of a small signal line. In other embodiments, the apparatus 110 may be mounted to a mast or other structure subject to sway or vibration. The small cell apparatus 110 may include an integral motion sensing device 136 as well as at least one radio 132 that communicates with subscriber equipment.

The motion sensing device 136 may collect data related to motion of the small cell apparatus 110. The data may be collected, at block 204, at a periodic rate or may be collected only when a predetermined motion threshold has been reached. In this exemplary embodiment, at block 206, a test is performed to determine if criteria for sending the motion data to a server for analysis has been met. The criteria may be or include expiration of a time period for reporting, being polled by the server for data, or when the motion data indicates a condition that merits monitoring. If the criteria is not met, execution may follow the 'no' branch back to block 204. If the criteria is satisfied, execution may follow the 'yes' branch to block 208, where the data may be sent to the server for analysis. In an embodiment, after the current data is downloaded any internal memory buffers may optionally be cleared at block 210 and execution may continue at block 204.

A technical effect of the disclosed system is a capability of the small cell apparatus 110 to determine whether it is moving and report such movement to a server or analysis process. The ability to self-detect motion may provide valuable insight into data rate changes and errors associated with the apparatus 110. The need for this type of detailed information did not exist in previous generations of base station equipment because tower and building mounted transmitters/antenna, particularly those operating at much lower frequencies, were not subject to disruption due to movement.

Both system operators and subscribers benefit from the ability to identify movement of a small cell apparatus 110 and from the corresponding ability to correlate that motion with transmission rate reductions and errors. Subscribers may experience fewer dropped calls and higher data rates while operators are able to meet quality of service (QoS) obligations and satisfy their subscribers.

The figures depict preferred embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A method of detecting motion in a small cell apparatus, the method comprising:
   providing the small cell apparatus with a first radio that communicates data with subscriber equipment and a second radio that communicates with a network service server;
   capturing a metric associated with motion in the small cell apparatus, said metric comprising data as a function of a mounting arrangement or an influences of a motion sensing device of the small cell apparatus; and
   communicating the metric to the network service server via the second radio, wherein the metric includes a magnitude of the motion in multiple directions.

2. The method of claim 1, wherein providing the small cell apparatus comprises providing the small cell apparatus with a weather-resistant housing.

3. The method of claim 1, wherein capturing the metric associated with motion comprises capturing the metric via a satellite navigation receiver.

4. The method of claim 1, wherein capturing the metric associated with motion comprises capturing the metric via an accelerometer mounted normal to an expected direction of motion.

5. The method of claim 1, further comprising operating the second radio exclusively via a battery dedicated to powering only the second radio.

6. The method of claim 1, wherein the second radio is an Internet of Things (IoT) device operating over a lightweight machine-to-machine protocol being one of Lightweight Machine-to-Machine (LwM2M), Narrowband Internet of Things (NB-IoT), Long Range spread spectrum (LoRa), or Differential Binary Phase Shift Keying (DBPSK).

7. The method of claim 1, further comprising authenticating endpoints in communication with the second radio via a subscriber identity module (SIM) coupled to the second radio.

8. The method of claim 1, further comprising encrypting payloads communicated by the second radio via a subscriber identity module (SIM) coupled to the second radio.

9. A method of detecting motion in a small cell apparatus, the method comprising:
   providing the small cell apparatus with a first radio that communicates data with subscriber equipment and a second radio that communicates with a network service server;
   capturing a metric associated with motion in the small cell apparatus;
   and
   communicating the metric to the network service server via the second radio, wherein capturing the metric occurs only when a transmission error is detected.

10. The method of claim 9, wherein the communicated metric is analyzed to detect a transmission error between the first radio and a subscriber equipment.

11. The method of claim 9, wherein capturing the metric associated with motion comprises one of the following:
   capturing the metric via a satellite navigation receiver; or
   capturing the metric via an accelerometer mounted normal to an expected direction of motion.

12. The method of claim 9, further comprising operating the second radio exclusively via a battery dedicated to powering only the second radio.

13. The method of claim 9, wherein the second radio is an Internet of Things (IoT) device operating over a lightweight machine-to-machine protocol being one of Lightweight Machine-to-Machine (LwM2M), Narrowband Internet of Things (NB-IoT), Long Range spread spectrum (LoRa), or Differential Binary Phase Shift Keying (DBPSK).

14. The method of claim 9, further comprising authenticating endpoints in communication with the second radio via a subscriber identity module (SIM) coupled to the second radio.

15. The method of claim 9, further comprising encrypting payloads communicated by the second radio via a subscriber identity module (SIM) coupled to the second radio.

16. A method of detecting motion in a small cell apparatus, the method comprising:
   providing the small cell apparatus with a first radio that communicates data with subscriber equipment and a second radio that communicates with a network service server;
   capturing a metric associated with motion in the small cell apparatus; and
   communicating the metric to the network service server via the second radio, wherein capturing the metric occurs only when a threshold level of motion is detected.

17. The method of claim 16, wherein capturing the metric associated with motion comprises one of the following:
   capturing the metric via a satellite navigation receiver; or
   capturing the metric via an accelerometer mounted normal to an expected direction of motion.

18. The method of claim 16, further comprising operating the second radio exclusively via a battery dedicated to powering only the second radio.

19. The method of claim 16, wherein the second radio is an Internet of Things (IoT) device operating over a lightweight machine-to-machine protocol being one of Lightweight Machine-to-Machine (LwM2M), Narrowband Internet of Things (NB-IoT), Long Range spread spectrum (LoRa), or Differential Binary Phase Shift Keying (DBPSK).

20. The method of claim 16, further comprising:
authenticating endpoints in communication with the second radio via a subscriber identity module (SIM) coupled to the second radio; or
encrypting payloads communicated by the second radio via a subscriber identity module (SIM) coupled to the second radio.

* * * * *